C. J. SUNDSTROM.
CALF WEANER.
APPLICATION FILED AUG. 27, 1920.

1,383,442. Patented July 5, 1921.

WITNESSES
George Ritty
J. R. Cerny

INVENTOR
C. J. Sundstrom
H. J. Sanders
BY ATTORNEY

UNITED STATES PATENT OFFICE.

CARL J. SUNDSTROM, OF MUD BUTTE, SOUTH DAKOTA.

CALF-WEANER.

1,383,442.  Specification of Letters Patent.  Patented July 5, 1921.

Application filed August 27, 1920. Serial No. 406,425.

*To all whom it may concern:*

Be it known that I, CARL J. SUNDSTROM, a citizen of Sweden, residing at Mud Butte, in the county of Meade and State of South Dakota, have invented certain new and useful Improvements in Calf-Weaners, of which the following is a specification.

This invention relates to improvements in calf weaners and its object is to provide a device of simple construction that will effectually prevent a calf from nursing the mother animal. With the foregoing and other objects in view the invention consists in the combination and arrangement of parts to be hereinafter fully described, pointed out in the appended claims and illustrated in the accompanying drawing which forms a part of this specification and in which—

Like reference characters denote corresponding parts in both views.

Figure 1:
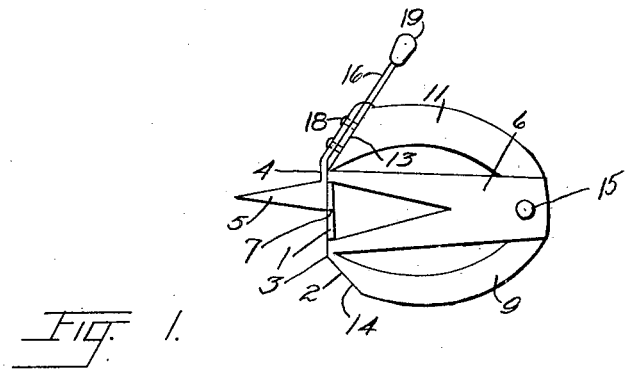
Figure 1 is a view of my improved calf weaner, assembled, in side elevation.
Figure 2:
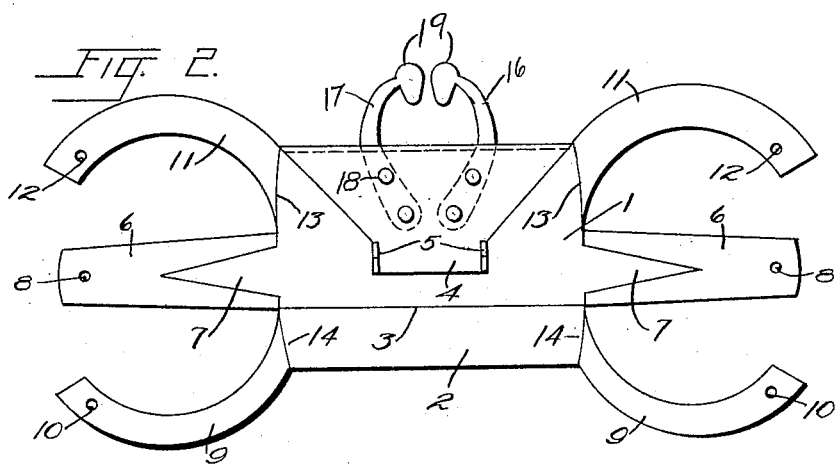
Fig. 2 is a plan view of the device after it is cut from the blank and but partially folded into position.

My calf weaner comprises a plate 1, a lower strip or lip-portion 2 of the plate being bent along the line 3 at an angle to the portion 1, and a portion of said plate being bent back upon itself and tapered toward its free end to form the apron 4, said apron at its free end being formed with the oppositely disposed prongs 5 which are disposed at right angles to the said apron and to the plate 1. The plate 1 is further formed with the oppositely disposed arms 6 in each of which a pointed tongue 7 is formed, each of said arms 6 being formed with a perforation 8 in its end. The said strip 2 is formed with the integral oppositely disposed curved arms 9 each of which is formed with a terminal perforation 10, and the plate 1 is formed with the oppositely disposed curved arms 11 disposed upon the opposite side of the arms 6 with relation to the arms 9, said arms 11 being formed in their ends with the perforations 12. The arms 11 are folded along the lines 13 to a position substantially at right angles to the plate 1, the arms 9 are folded along the lines 14 into a similar position and the arms 6 folded into a position in alinement with the said arms 11, 9 but the tongues 7 are left disposed laterally from the said plate. The ends of the arms 11 and 9 are drawn toward the arms 6 until the perforations 10, 8, 12 are alined when rivets 15 are employed to secure said members together to form side shields for the plate 1, the operation just described serving to gently curve the plate 1 and give the device the general appearance illustrated in Fig. 1.

To the plate 1 the arms 16, 17 are secured, the pin 18 of arm 17 being removable to permit the arm to be moved upon the remaining pin, which is a pivot pin, relatively to the arm 16. Each arm terminates in a head 19, said heads being adapted for insertion in the nostrils of the animal to support the device in position. With the device as shown in Fig. 1 and the arm 17 pivotally supported upon one pin the free ends of the arms are inserted in the nostrils of the animal. The removable pin 18 is then re-inserted and the device is suspended from the nostrils of the animal with the plate 1 and strip 2 depending in front of the mouth of the animal, the arms 11, 6, 9 serving as side shields to prevent nursing the mother animal from the side. The prongs 5 or tongues 7 will prick the mother animal should the calf endeavor to nurse her and so cause her to avoid the calf. The manner in which the device is supported enables the calf to drink freely from a trough or stream and to eat growing vegetation without hindrance.

What is claimed is:—

1. In a calf weaner, a plate, a lip disposed at an angle to said plate, shields disposed laterally of said plate and lip and approximately at right angles thereto, oppositely disposed tongues projected laterally from said plate, an apron formed integral with said plate and bent back thereupon, spaced prongs formed integral with said apron and disposed at right angles thereto, and handles carried by said plate, one of said handles being capable of manual adjustment.

2. In a calf weaner, a plate, a lip disposed at an angle to said plate, oppositely disposed straight arms integral with said plate, curved arms formed above and below said straight arms, the ends of said curved arms and said straight arms being riveted together to form side shields and disposed substantially at right angles to said plate, tongues extending laterally from said plate in the plane thereof, an apron integral with said plate and bent back thereupon, said apron being tapered toward its free end, spaced prongs carried terminally by said apron and disposed at right angles thereto, and handles carried by said plate, one of said handles being capable of manual adjustment.

In testimony that I claim the foregoing as my own I have hereto affixed my signature in the presence of two subscribing witnesses.

CARL J. SUNDSTROM.

Witnesses:
ALPHIE JOHNSON,
A. W. HEGGELUND.